(12) United States Patent
Furukawa et al.

(10) Patent No.: US 11,691,496 B2
(45) Date of Patent: Jul. 4, 2023

(54) VEHICLE DRIVE SYSTEM

(71) Applicant: Mazda Motor Corporation, Hiroshima (JP)

(72) Inventors: Akihiro Furukawa, Hiroshima (JP); Ikuo Usami, Hiroshima (JP); Kazuya Kotani, Hiroshima (JP); Seiyo Hirano, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 88 days.

(21) Appl. No.: 17/343,774

(22) Filed: Jun. 10, 2021

(65) Prior Publication Data
US 2021/0394606 A1 Dec. 23, 2021

(30) Foreign Application Priority Data

Jun. 19, 2020 (JP) .................. 2020-106230

(51) Int. Cl.
| | |
|---|---|
| *B60K 6/28* | (2007.10) |
| *B60W 20/15* | (2016.01) |
| *B60L 50/64* | (2019.01) |
| *B60L 58/22* | (2019.01) |
| *B60K 1/04* | (2019.01) |

(Continued)

(52) U.S. Cl.
CPC .................. *B60K 6/28* (2013.01); *B60K 1/04* (2013.01); *B60K 6/24* (2013.01); *B60K 6/26* (2013.01); *B60K 7/0007* (2013.01); *B60L 15/20* (2013.01); *B60L 50/64* (2019.02); *B60L 58/22* (2019.02); *B60W 10/06* (2013.01); *B60W 10/08* (2013.01); *B60W 20/15* (2016.01);
(Continued)

(58) Field of Classification Search
CPC ........... B60W 20/10; B60K 6/24; B60K 6/26; B60K 6/28; B60L 15/20; B60L 50/60; B60L 53/60; B60L 58/12; B60L 58/22; B60Y 2200/92; B60Y 2300/91
See application file for complete search history.

(56) References Cited

U.S. PATENT DOCUMENTS

| | | |
|---|---|---|
| 2009/0250279 A1 | 10/2009 | Holmes |
| 2017/0331392 A1 | 11/2017 | Sahhary et al. |

(Continued)

FOREIGN PATENT DOCUMENTS

| | | |
|---|---|---|
| EP | 1834830 A1 | 9/2007 |
| EP | 3372439 A1 | 9/2018 |

(Continued)

OTHER PUBLICATIONS

Extended European search report dated Nov. 10, 2021, in corresponding European patent Application No. 21178222.2, 12 pages.

*Primary Examiner* — Erez Gurari
(74) *Attorney, Agent, or Firm* — Xsensus LLP

(57) ABSTRACT

In a vehicle drive system using a motor for cruising, the connection node of serially-connected first and second batteries is grounded. The operation of an inverter is controlled so that the motor drive voltage is higher than the output voltage of each of the first and second batteries. A battery unit is configured so that third and fourth batteries each in a form of a cartridge are removably loaded, and the loaded third battery is connected in parallel with the first battery and the loaded fourth battery is connected in parallel with the second battery.

16 Claims, 14 Drawing Sheets

(51) Int. Cl.
  *B60K 6/24* (2007.10)
  *B60K 6/26* (2007.10)
  *B60K 7/00* (2006.01)
  *B60L 15/20* (2006.01)
  *B60W 10/06* (2006.01)
  *B60W 10/08* (2006.01)
  *B60W 30/182* (2020.01)

(52) U.S. Cl.
  CPC ... *B60W 30/182* (2013.01); *B60K 2001/0416* (2013.01); *B60Y 2200/92* (2013.01); *B60Y 2300/91* (2013.01)

(56) References Cited

U.S. PATENT DOCUMENTS

| | | | |
|---|---|---|---|
| 2018/0108891 A1* | 4/2018 | Fees | H01M 50/298 |
| 2019/0111801 A1* | 4/2019 | Moon | H02J 7/0019 |
| 2019/0232900 A1 | 8/2019 | Teng et al. | |
| 2020/0122580 A1 | 4/2020 | Zou et al. | |
| 2020/0189379 A1 | 6/2020 | Hirukawa et al. | |
| 2020/0384882 A1* | 12/2020 | Falls | H02J 7/0045 |
| 2021/0008971 A1 | 1/2021 | Toda et al. | |
| 2021/0016653 A1 | 1/2021 | Toda et al. | |
| 2021/0016765 A1 | 1/2021 | Toda et al. | |
| 2021/0016782 A1 | 1/2021 | Toda et al. | |
| 2021/0023935 A1 | 1/2021 | Toda et al. | |
| 2021/0039509 A1 | 2/2021 | Toda et al. | |
| 2021/0075415 A1* | 3/2021 | Nakagawa | H03K 19/0027 |
| 2021/0129651 A1* | 5/2021 | Klomberg | B60L 50/64 |

FOREIGN PATENT DOCUMENTS

| | | |
|---|---|---|
| JP | 2019-162964 A | 9/2019 |
| JP | 2019-163026 A | 9/2019 |
| WO | 2020/051427 A1 | 3/2020 |

* cited by examiner

VEHICLE DRIVE SYSTEM

CROSS-REFERENCE TO RELATED APPLICATION

This application claims priority to Japanese Patent Application No. 2020-106230 filed on Jun. 19, 2020, the entire disclosure of which is incorporated by reference herein.

BACKGROUND

The present disclosure relates to a vehicle drive system that uses a motor for cruising and a battery.

A vehicle drive system for driving a motor for cruising by a high-voltage battery has been conventionally known. Since the power output of the motor depends on the current and the voltage (P=I·V·cos θ), to increase the output of the motor, it is effective to raise the voltage of the battery. In general, a high-voltage battery of 60V or higher is used for driving a motor for cruising.

In a device using a high-voltage battery, measures against high voltage are necessary for parts and wires of the device, and this leads to increase in cost and weight. For example, wires for connecting an inverter with the battery become large in size and heavy. Also, as connectors for the inverter and the battery, expensive ones resistant to high voltage must be used. On the other hand, since the current value required for attaining given motor output becomes smaller as the voltage is higher (P=I·V·cos θ), motor loss can be reduced (Ploss=R·I²). This improves the electric mileage of the vehicle. In recent years, a configuration having a higher-voltage battery is in the mainstream, placing higher priority on the merit of improving the electric mileage than the demerit of increasing the vehicle weight and cost.

Japanese Unexamined Patent Publication No. 2019-162964 discloses a configuration of a hybrid drive unit principally using the driving force of a motor. In this configuration, a low-voltage battery and a capacitor are serially connected, forming a high-voltage power supply for driving the motor.

In general, a capacitor can supply a larger current momentarily than a normal battery. In the configuration of the cited patent document, such a capacitor with good responsiveness is used for acceleration at the startup of a vehicle, for example. However, since a capacitor is small in energy density, it is difficult for the capacitor to supply electric power to the motor for a long time. It is therefore preferable to use a battery, not a capacitor, from the standpoint of securing the cruising distance.

An objective of the present disclosure is providing a vehicle drive system using a motor for cruising, capable of increasing the output of the motor, achieving long-time power supply to the motor, and alleviating a problem of the cruising distance while keeping the vehicle weight and cost from increasing.

SUMMARY

The inventors of the present disclosure have attained the following findings as a result of experiments and examinations on the vehicle drive system having the configuration described above.

That is, in the above-described vehicle drive system, the connection node of serially connected first and second batteries is connected to the ground, to reduce the voltage output from the battery unit. Also, a 3-level inverter is used as the inverter, so that a motor drive voltage higher than the battery voltage is generated. It is therefore possible to implement a vehicle drive system with a reduced weight, low cost, and high motor output.

As a result of experiments by the present inventors, however, it has been found that the vehicle drive system having the above-described configuration fails to secure output performance as excellent as expected. From our examinations, the reason for this has been found to be variations in charged amount (SOC)/voltage between the batteries.

That is, with variations in charged amount/voltage between the batteries that supply power to the inverter, the amplitude of the motor drive voltage varies, causing torque fluctuations of the motor. In vehicle driving, torque fluctuations of the motor become a cause of greatly impairing driving comfort and therefore must be kept to a minimum. To keep torque fluctuations to a minimum, however, the inverter output is forced to be restricted to suit to one of the batteries lower in charged amount/voltage. This raises a problem of failing to make full use of the potential of the vehicle drive system.

The present inventors have thus attained the findings that, in order to adequately secure the motor output performance in the vehicle drive system having the above-described configuration, it is important to strike a balance in charged amount/voltage between the batteries that supply power to the inverter. Based on the findings, the present inventors have invented a configuration as described below.

That is, according to the present disclosure, a vehicle drive system includes: a motor that generates driving force for drive wheels; an inverter electrically connected to the motor; a battery unit that supplies electric power to the inverter; and a control unit that controls operation of the inverter, wherein the battery unit is configured to house a first and second batteries, and configured so that, when the first and second batteries are housed, the first and second batteries are serially connected, and a negative pole of the first battery and a positive pole of the second battery that are mutually connected are grounded, the control unit controls the operation of the inverter so that a voltage output from the inverter to the motor is higher than an output voltage of the first battery and also than an output voltage of the second battery, and at least one of the first and second batteries is a battery cartridge configured to be removably loaded into the battery unit.

With the above configuration, since the connection node of the serially-connected first and second batteries is grounded in the battery unit, a positive voltage of the same value as the output voltage of the first battery and a negative voltage of which the absolute value is the same as the output voltage of the second battery, with reference to the ground, are output from the battery unit. The operation of the inverter is controlled so that the motor drive voltage output from the inverter is higher than the output voltage of the first battery and also than the output voltage of the second battery. This makes it possible to increase the output of the motor while reducing the voltage of the output of the battery unit to keep the vehicle weight and cost from increasing. Moreover, since a low-voltage battery can be used, at least one of the first and second batteries can be a battery cartridge configured to be removably loaded into the battery unit. This makes battery replacement easy, and thus the problem of the cruising distance can be alleviated.

The battery cartridge may have a roughly quadrangular prism shape, with a first electric connecting part including a positive pole and a negative pole formed on one of end faces of the battery cartridge and a handle formed on the other end face.

With the above configuration, handling of the battery cartridge becomes easy, and this makes the replacement easy.

Further, the battery unit may have a hole for loading the battery cartridge, and the hole may have a second electric connecting part on its bottom and be configured so that, when the battery cartridge is loaded into the hole with the one end face of the battery cartridge facing the bottom of the hole, the first electric connecting part is electrically connected with the second electric connecting part.

With the above configuration, loading of the battery cartridge into the battery unit becomes easy.

Alternatively, according to the present disclosure, a vehicle drive system includes: a motor that generates driving force for drive wheels; an inverter electrically connected to the motor; a battery unit that supplies electric power to the inverter; and a control unit that controls operation of the inverter, wherein the battery unit has serially-connected first and second batteries, and a negative pole of the first battery and a positive pole of the second battery that are mutually connected are grounded, the control unit controls the operation of the inverter so that a voltage output from the inverter to the motor is higher than an output voltage of the first battery and also than an output voltage of the second battery, and the battery unit is configured so that third and fourth batteries each in a form of a cartridge are removably loaded, and the loaded third battery is connected in parallel with the first battery and the loaded fourth battery is connected in parallel with the second battery.

With the above configuration, since the connection node of the serially-connected first and second batteries is grounded in the battery unit, a positive voltage of the same value as the output voltage of the first battery and a negative voltage of which the absolute value is the same as the output voltage of the second battery, with reference to the ground, are output from the battery unit. The operation of the inverter is controlled so that the motor drive voltage output from the inverter is higher than the output voltage of the first battery and also than the output voltage of the second battery. This makes it possible to increase the output of the motor while reducing the voltage of the output of the battery unit to keep the vehicle weight and cost from increasing. Moreover, the battery unit is configured so that the third and fourth batteries each in a form of a cartridge are removably loaded, and the loaded third battery is connected in parallel with the first battery and the loaded fourth battery is connected in parallel with the second battery. This makes it possible to use an auxiliary battery and also makes replacement of the auxiliary battery easy, whereby the problem of the cruising distance can be alleviated.

The third and fourth batteries each may have a roughly quadrangular prism shape, with a first electric connecting part including a positive pole and a negative pole formed on one of end faces of the battery and a handle formed on the other end face.

With the above configuration, handling of the third and fourth batteries becomes easy, and this makes the replacement easy.

Further, the battery unit may have a hole for loading each of the third and fourth batteries, and the hole may have a second electric connecting part on its bottom and be configured so that, when the third or fourth battery is loaded into the hole with the one end face of the battery facing the bottom of the hole, the first electric connecting part is electrically connected with the second electric connecting part.

With the above configuration, loading of the third and fourth batteries into the battery unit becomes easy.

In the vehicle drive system described above, the battery unit may be placed behind a rearmost seat and in front of a fuel tank in the vehicle.

With the above configuration, a worker can easily access the battery unit, and thus battery replacement becomes further easy. Also, luggage space can be secured.

The vehicle drive system described above may further include a balance circuit that balances charged amounts of the first and second batteries by performing charge/discharge control between the first and second batteries With the above configuration, the charged amounts of the first and second batteries can be balanced by performing charge/discharge control between the first and second batteries by the balance circuit. It is therefore possible to make full use of the potential of the vehicle drive system and adequately secure the motor output performance while keeping the torque fluctuations of the motor to a minimum.

In the vehicle drive system described above, the inverter may be a multi-level inverter.

With the above configuration, the operation of the inverter can be easily controlled so that the voltage output from the inverter to the motor becomes higher than the output voltage of the first battery and also than the output voltage of the second battery.

In the vehicle drive system described above, the output voltages of the first and second batteries are each less than 60V, for example.

As described above, according to the present disclosure, in a vehicle drive system using a motor for cruising, it is possible to increase the output of the motor, achieve long-time power supply to the motor, and alleviate the problem of the cruising distance while keeping the vehicle weight and cost from increasing.

DETAILED DESCRIPTION

An illustrative embodiment will be described hereinafter in detail with reference to the accompanying drawings.

Figure 1:
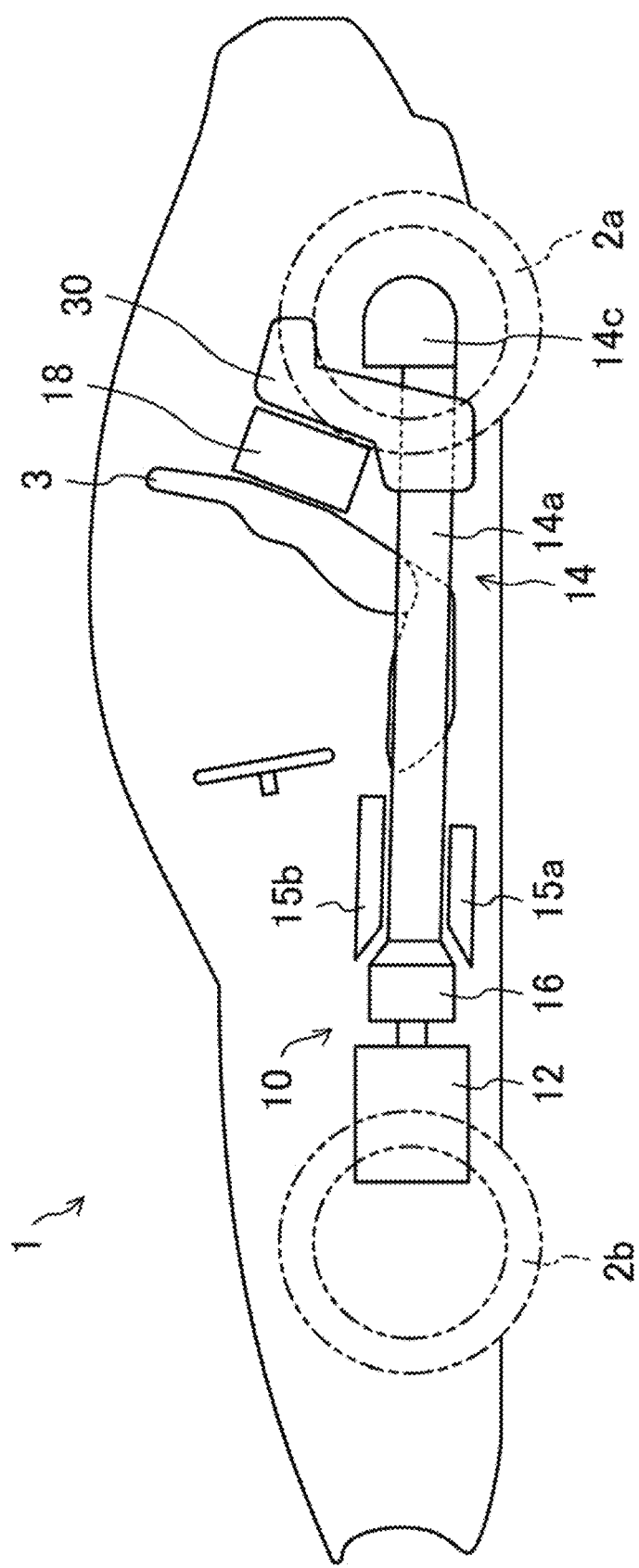
FIG. 1 shows an example of the layout of a vehicle drive system of an embodiment mounted in a vehicle.
Figure 2:
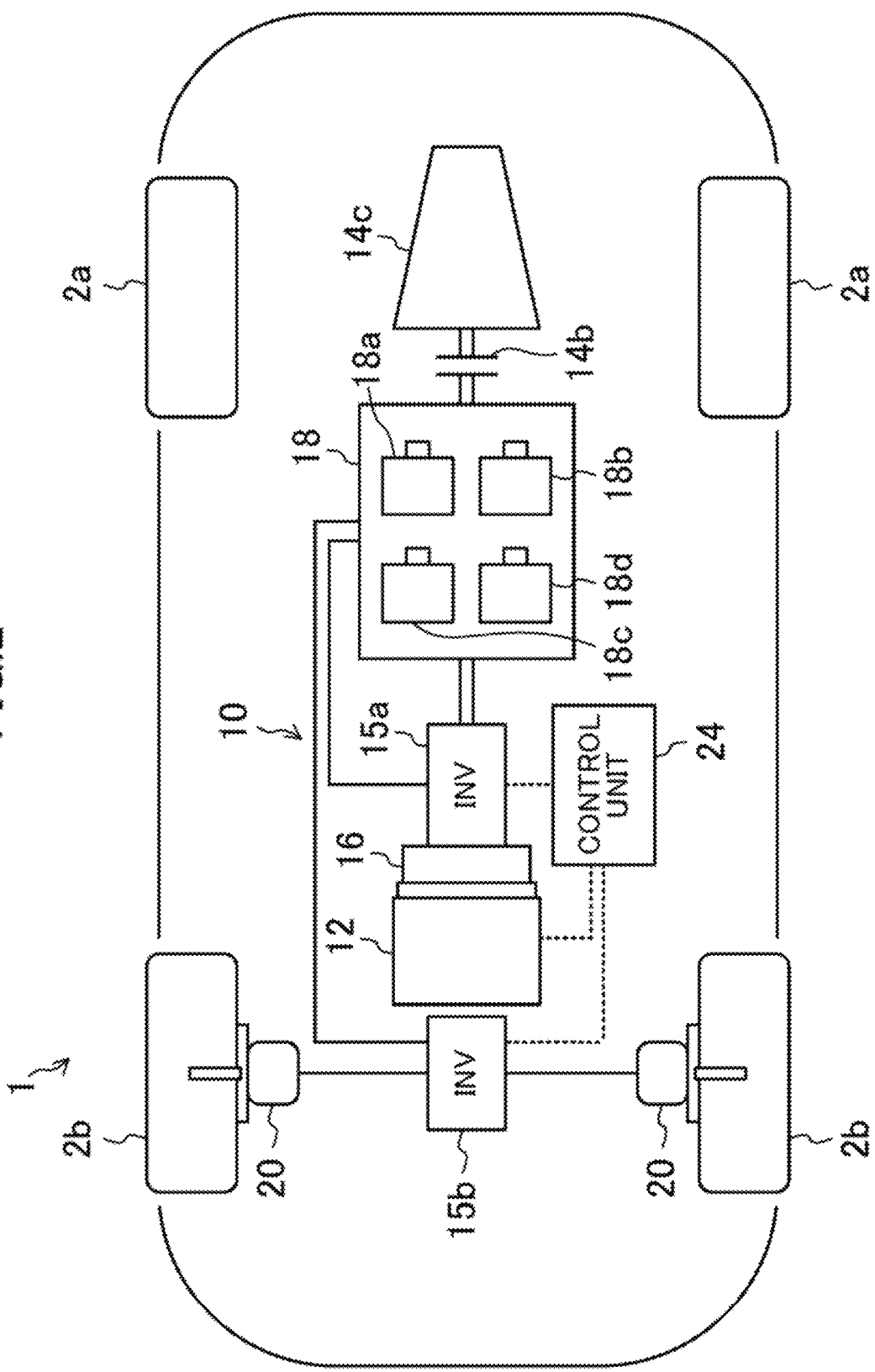
FIG. 2 shows a configuration example of the vehicle drive system of the embodiment.

FIG. 1 shows an example of the layout of a vehicle drive system of this embodiment mounted in a vehicle, illustrated as a phantom view of the vehicle viewed from a side. FIG. 2 shows a configuration example of the vehicle drive system of this embodiment.

As shown in FIGS. 1 and 2, a vehicle drive system 10 is mounted in a vehicle 1. The vehicle drive system 10 includes: an engine 12 that drives rear wheels 2a; a force transmission mechanism 14 that transmits driving force to the rear wheels 2a; a main drive motor 16 that drives the rear wheels 2a; sub-drive motors 20 that drive front wheels 2b; an inverter 15a electrically connected to the main drive motor 16; an inverter 15b electrically connected to the sub-drive motors 20; a battery unit 18 that supplies electric power to the inverters 15a and 15b; a control unit 24; and a fuel tank 30 that stores fuel to be supplied to the engine 12. That is, the vehicle drive system 10 is a hybrid drive system.

The engine 12 is an internal combustion engine for generating driving force for the rear wheels 2a that are main drive wheels of the vehicle 1, which is a rotary engine in this embodiment. The engine 12 may otherwise be an engine other than the rotary engine, such as a reciprocating engine. The engine 12 is placed in the front part of the vehicle 1 and drives the rear wheels 2a through the force transmission mechanism 14.

The force transmission mechanism 14 is configured to transmit the driving force generated by the engine 12 to the rear wheels 2a that are the main drive wheels. The force transmission mechanism 14 includes a propeller shaft 14a connected to the engine 12, a clutch 14b, and a transmission 14c that is a stepped gearbox. The propeller shaft 14a extends from the engine 12 placed in the front part of the vehicle 1 toward the rear of the vehicle 1 through a propeller shaft tunnel (not shown). The rear end of the propeller shaft 14a is connected to the transmission 14c via the clutch 14b. An output axis of the transmission 14c is connected to axles (not shown) of the rear wheels 2a, to drive the rear wheels 2a.

The main drive motor 16 is an electric motor for generating driving force for the rear wheels 2a that are the main drive wheels of the vehicle 1, placed adjacent to the engine 12 on the rear side of the engine 12. The main drive motor 16 is serially connected with the engine 12, so that the driving force generated by the main drive motor 16 is also transmitted to the rear wheels 2a through the force transmission mechanism 14. In this embodiment, a 25 kW permanent magnet synchronous motor driven at 48V is used as the main drive motor 16.

The inverter 15a, placed adjacent to the main drive motor 16, converts DC electric power supplied from the battery unit 18 to AC electric power and supplies the power to the main drive motor 16.

The sub-drive motors 20 are electric motors for generating driving force for the front wheels 2b that are sub-drive wheels and, in this embodiment, are in-wheel motors housed in the front wheels 2b. In this embodiment, 17 kW induction motors are used as the sub-drive motors 20.

The inverter 15b converts DC electric power supplied from the battery unit 18 to AC electric power and supplies the power to the sub-drive motors 20.

The battery unit 18 is placed behind a seat 3 and in front of the fuel tank 30. In this embodiment, the battery unit 18 includes four batteries 18a, 18b, 18c, and 18d. Each of the batteries 18a to 18d, having an output voltage of 48V, includes four serially-connected 12V battery cells inside.

The batteries 18a and 18b are electrically connected in series and fixed in the battery unit 18. As will be described later, the connection node of the batteries 18a and 18b, i.e., the negative pole of the battery 18a and the positive pole of the battery 18b are connected to the ground, in common with the inverter 15a. The battery 18c is connected in parallel with the battery 18a, and the battery 18d is connected in parallel with the battery 18b. In this case, the batteries 18c and 18d are battery cartridges removably loaded into the battery unit 18. The battery unit 18 is configured so that, once the cartridge batteries 18c and 18d are loaded thereinto, the battery 18c is connected in parallel with the battery 18a and the battery 18d is connected in parallel with the battery 18b.

The control unit 24 is configured to control the engine 12, the inverter 15a electrically connected with the main drive motor 16, and the inverter 15b electrically connected with the sub-drive motors 20 whereby the vehicle 1 can execute an engine cruise mode and a motor cruise mode appropriately. Specifically, the control unit 24 can be constituted by a microprocessor, a memory, an interface circuit, and a program for actuating these (none of these is shown).

Switching control between the engine cruise mode and the motor cruise mode is performed as follows, for example. It is assumed that the vehicle 1 is provided with a switch for selecting the engine cruise mode or the motor cruise mode.

The mode is set at the motor cruise mode in which the vehicle cruises at a comparatively low speed, repeating start and stop, on a city street. In the motor cruise mode, the control unit 24 controls to supply electric power from the battery unit 18 to the inverter 15a to drive the main drive motor 16. Meanwhile, the control unit 24 controls not to supply fuel to the engine 12 to prevent the engine 12 from producing torque. In this case, the vehicle 1 purely functions as an electric vehicle (EV).

Even when the vehicle 1 is cruising at a speed higher than a given speed, the motor cruise mode is maintained as long as an acceleration of a given amount or greater is not exerted, and the vehicle 1 is driven by the main drive motor 16.

Assume here that the driver operates the switch to change the mode to the engine cruise mode and depresses the accelerator pedal. In the engine cruise mode, the control unit 24 starts supply of fuel to the engine 12, whereby the engine 12 produces torque. Meanwhile, the control unit 24 stops the control on the inverter 15a to stop the drive by the main drive motor 16. The driver then can enjoy a feeling of driving the vehicle 1 driven by the engine 12.

Figure 3:
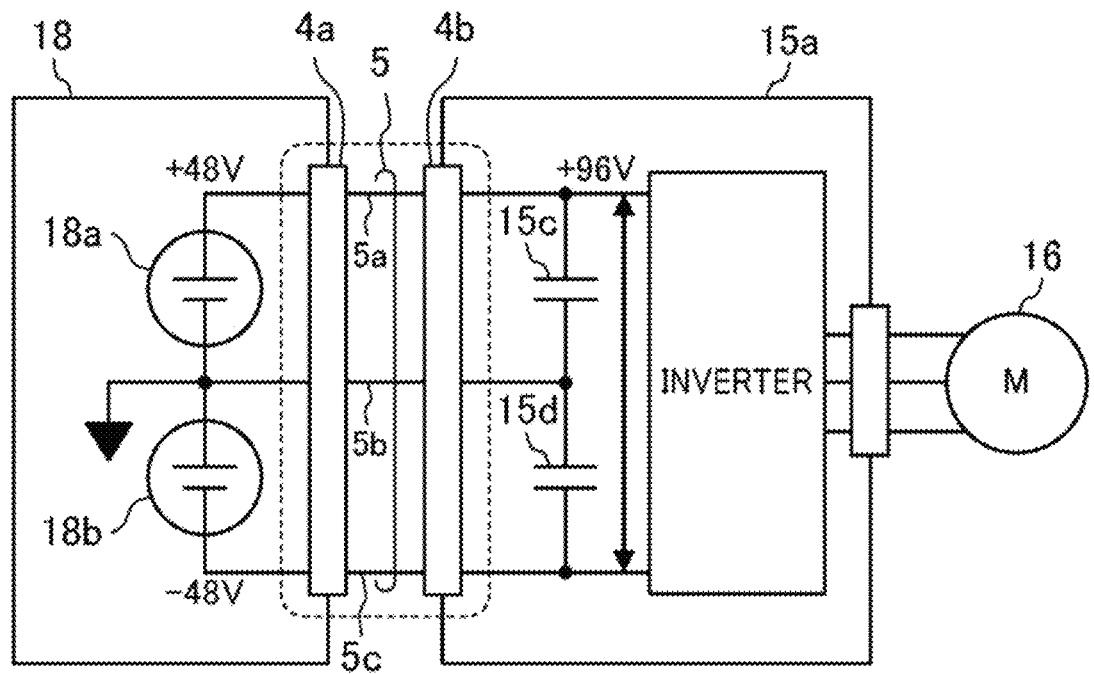
FIG. 3 shows a main circuit configuration for motor driving in the vehicle drive system of the embodiment.
Figure 4:
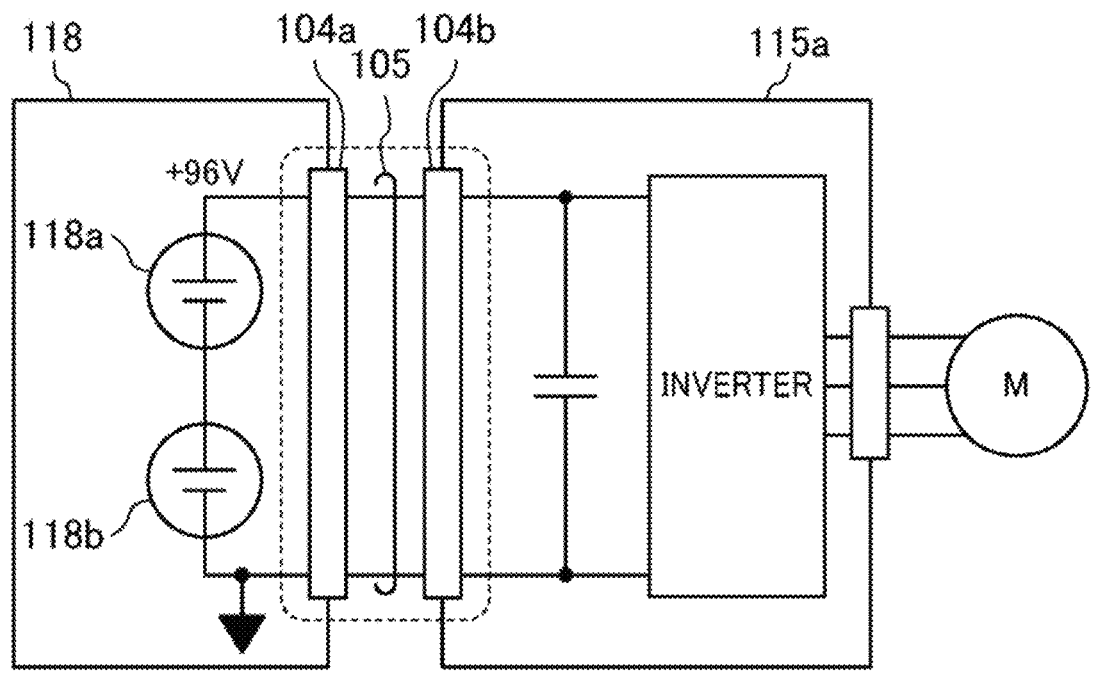
FIG. 4 shows a main circuit configuration for motor driving according to a comparative example.

FIG. 3 shows a configuration of main circuits related to motor driving in the vehicle drive system of this embodiment. FIG. 4 shows a configuration of main circuits related to motor driving according to a comparative example.

As shown in FIG. 3, in this embodiment, a connector 4a of the battery unit 18 and a connector 4b of the inverter 15a are electrically connected through three wires 5 (5a, 5b, and 5c). In the battery unit 18, the batteries 18a and 18b are serially connected, and their connection node, i.e., the negative pole of the battery 18a and the positive pole of the battery 18b are connected to the ground. The wire 5a is connected to the positive pole of the battery 18a, the wire 5b is connected to the negative pole of the battery 18a and the positive pole of the battery 18b, and the wire 5c is connected to the negative pole of the battery 18b. That is, voltages of ±48V are output from the battery unit 18.

In the inverter 15a, capacitors 15c and 15d are serially connected, and their connection node is connected to the wire 5b. The other end of the capacitor 15c is connected to the wire 5a, and the other end of the capacitor 15d is connected to the wire 5c. That is, a voltage of 96 V is applied to the capacitors 15c and 15d.

Safety measures against high voltage are basically unnecessary for a low voltage less than 60 V, and low-cost elements and parts can be used. Specifically, in the configuration of FIG. 3, inexpensive ones for low voltage can be used as the connectors 4a and 4b and the wires 5. Also, the weight of harnesses, etc. can be widely reduced.

On the contrary, in the configuration of FIG. 4, in a battery unit 118, batteries 118a and 118b are serially connected, and a voltage at both ends thereof, 96 V, is output from the battery unit 118. Therefore, as a connector 104a in the battery unit 118 and a connector 104b in an inverter 115a, high voltage-support ones must be used. Also, as wires 105 for connecting the connectors 104a and 104b, expensive and heavy ones for high voltage must be used.

In other words, in the configuration of this embodiment, since the connection node of the serially-connected batteries 18a and 18b is grounded in the battery unit 18, a positive voltage of the same value as the output voltage of the battery 18a and a negative voltage of which the absolute value is the same as the output voltage of the battery 18b, with reference to the ground, are output from the battery unit 18. This decreases the voltage of the output of the battery unit 18, and thus can keep the vehicle weight and cost from increasing.

Further, in this embodiment, to attain a motor drive voltage higher than the battery voltage 48V, a 3-level inverter is used as the inverter 15a.

Figure 5A:
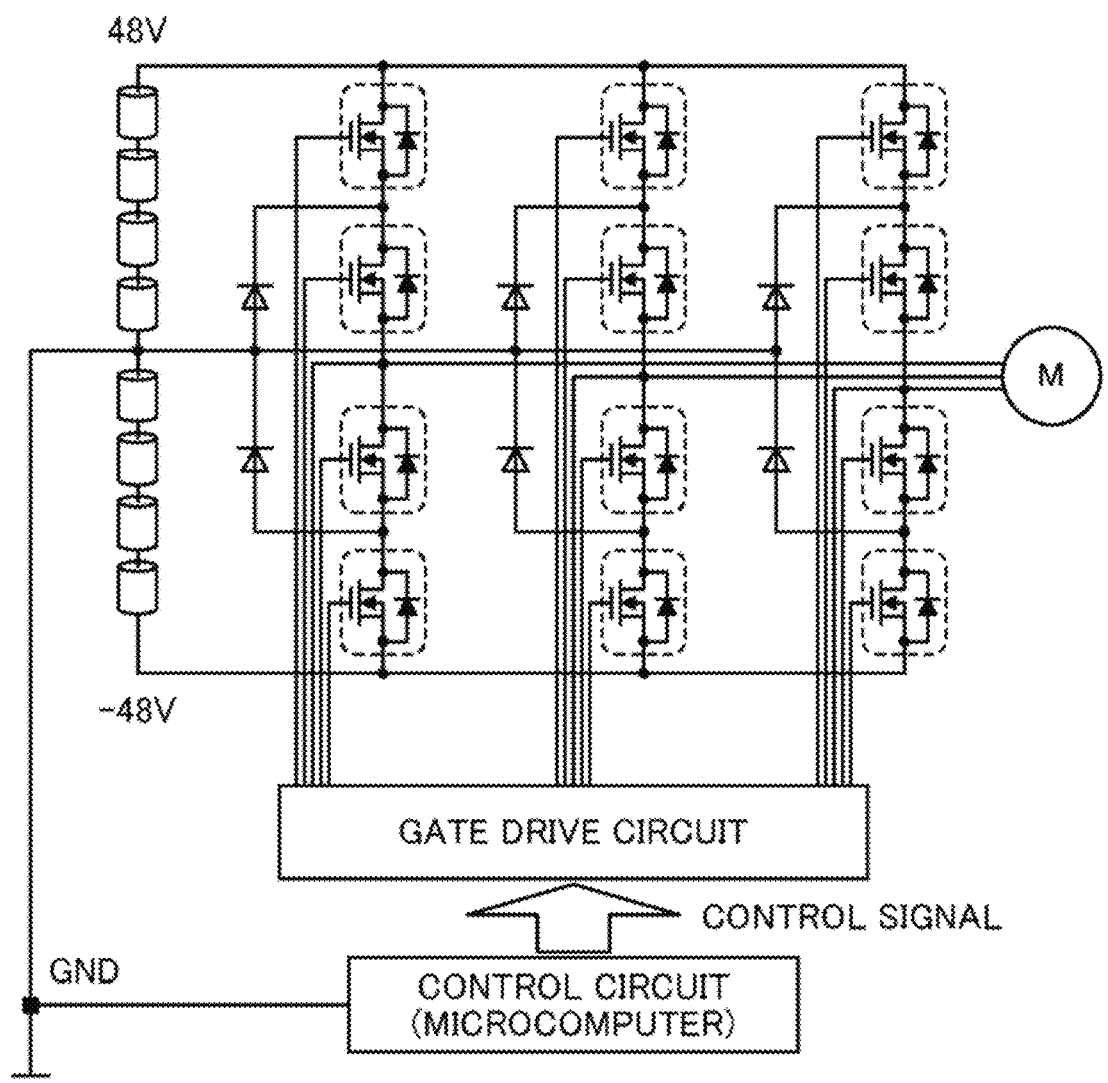
FIGS. 5A and 5B show a configuration outline and an operation, respectively, of a 3-level inverter.
Figure 5B:
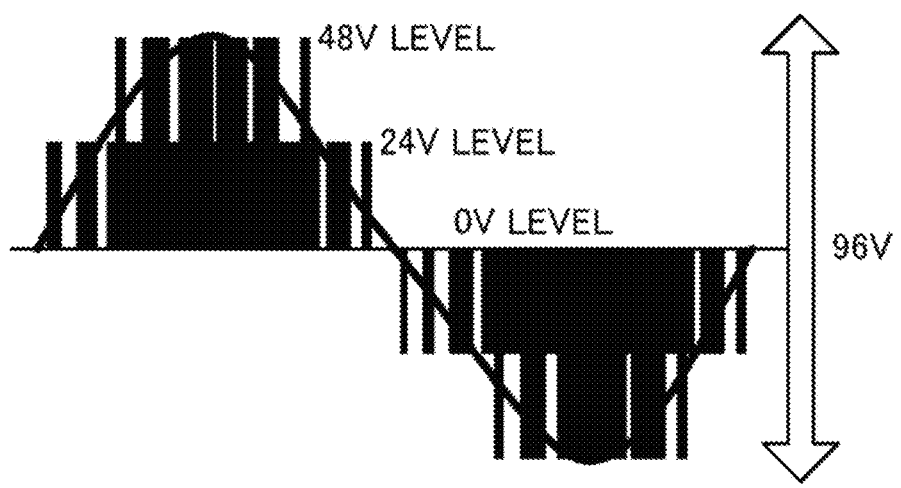

FIGS. 5A and 5B are views showing an outline of a 3-level inverter, where FIG. 5A shows a circuit configuration and FIG. 5B shows a waveform of the output voltage. As shown in FIG. 5A, in a 3-level inverter, two serially-connected switching elements are placed in each of the positive side and the negative side. For control of a 3-phase motor, a total of 12 (2×2×3) switching elements are necessary. When ±48V are given as the battery voltages, a motor drive voltage of 96 V can be generated by controlling the switching elements, as shown in FIG. 5B. As the switching elements, MOSFETs low in withstand voltage compared to IGBTs can be used.

Figure 6:
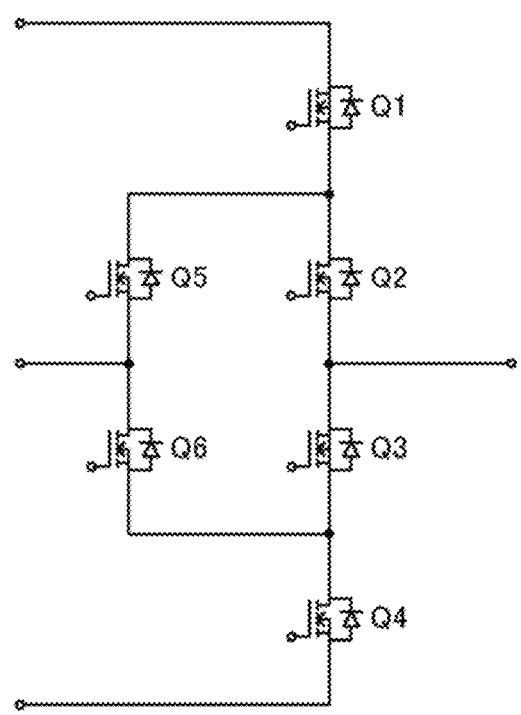
FIG. 6 shows an inverter circuit of one phase of the 3-level inverter.

FIG. 6 shows a configuration example of an inverter circuit corresponding to one phase. In FIG. 6, the connection node of switching elements Q5 and Q6 is connected to the ground. To the switching element Q5, the same drive signal given to a switching element Q3 is given, and to the switching element Q6, the same drive signal given a switching element Q2 is given.

Figure 7:
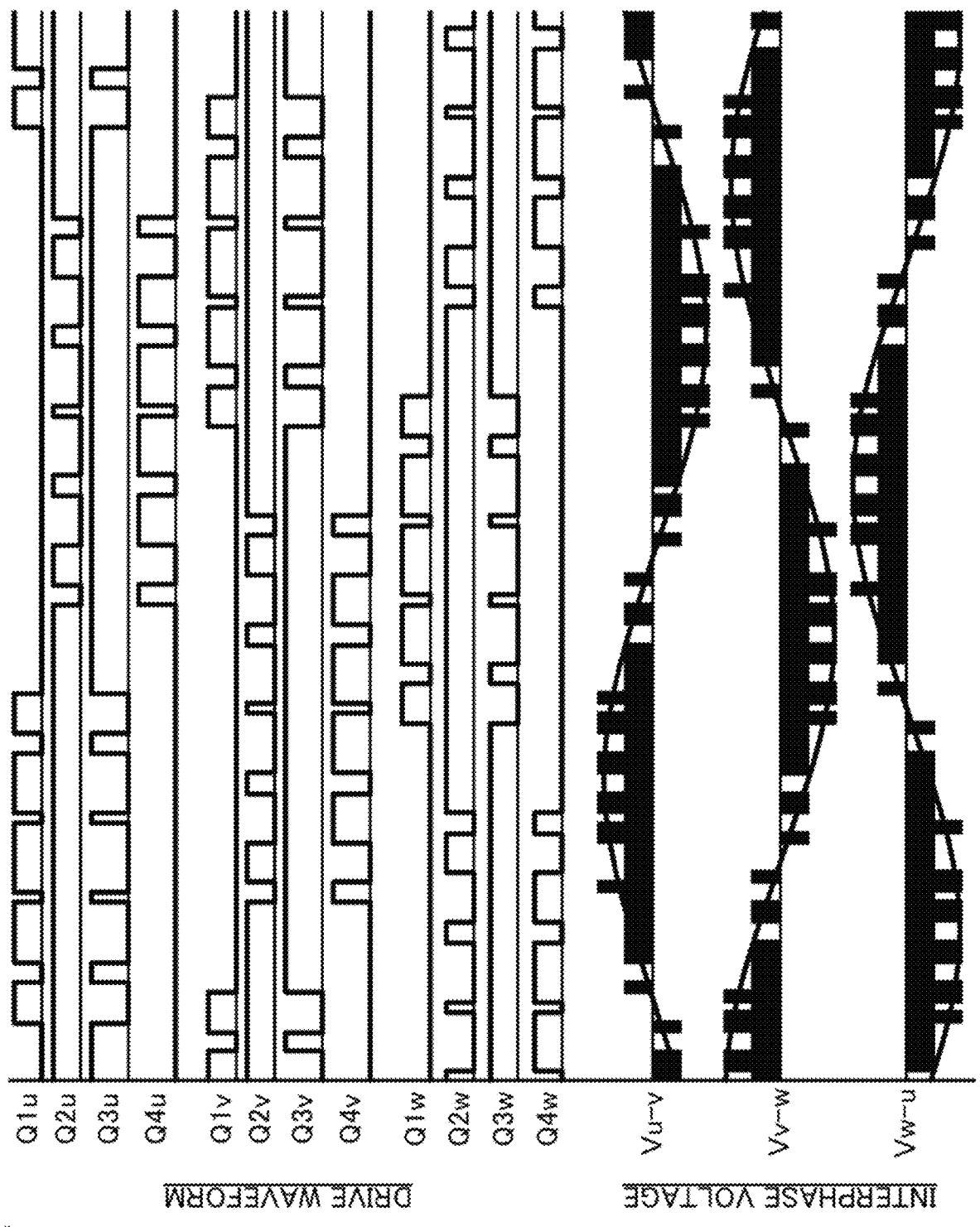
FIG. 7 shows a detailed operation diagram of the 3-level inverter.

FIG. 7 shows examples of drive waveforms for switching elements in each phase and interphase voltages. As shown in FIG. 7, the difference between voltages in two phases driven according to the drive waveforms is to be an interphase voltage between the two phases. For example, the difference between the voltage in u phase driven according to drive waveforms Q1u to Q4u and the voltage in v phase driven according to drive waveforms Q1v to Q4v is to be an interphase voltage Vu-v. By controlling the inverter as shown in FIG. 7, a motor drive voltage of 96 V can be generated from the battery voltages of ±48V, for example.

Figure 8:
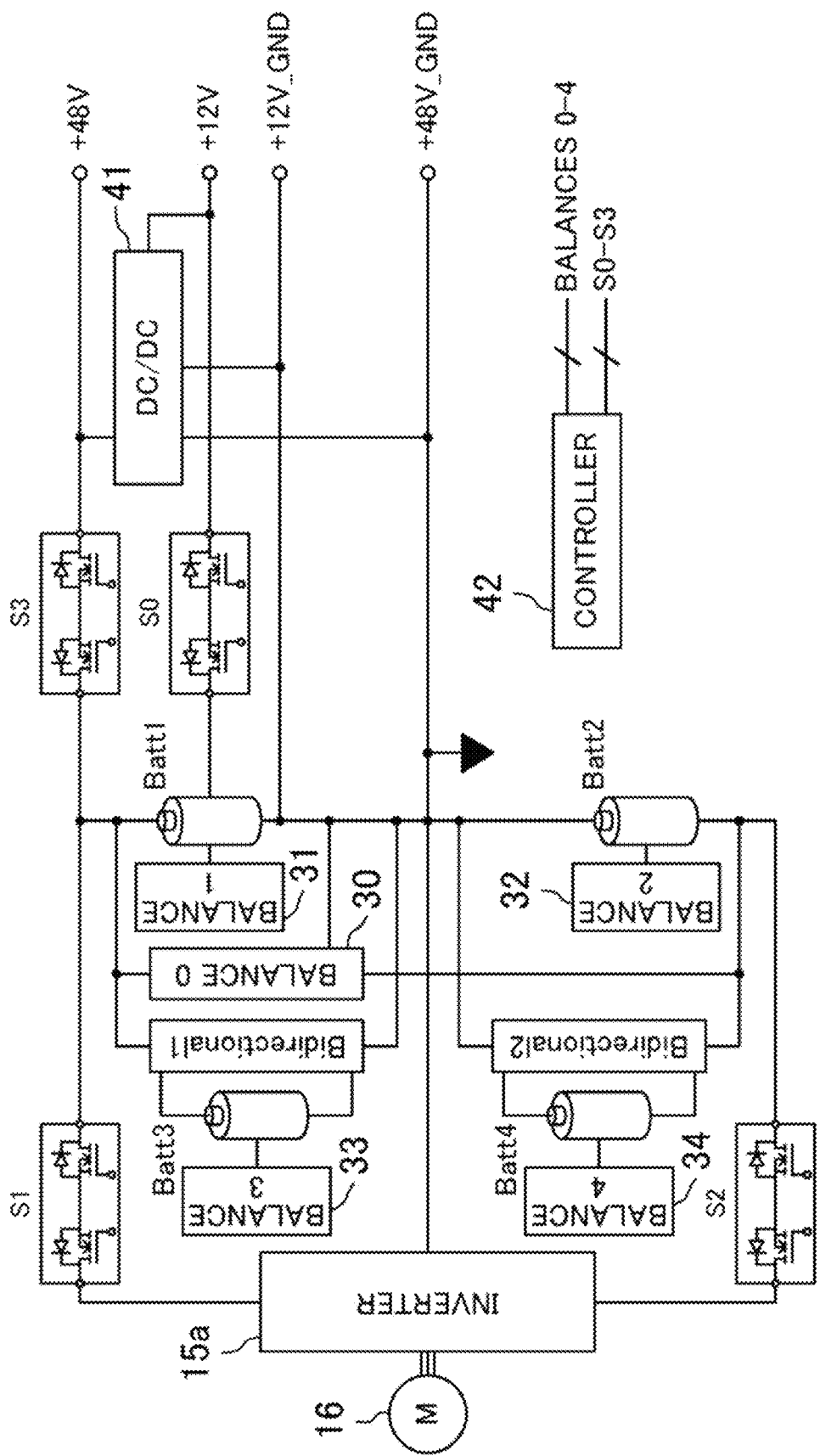
FIG. 8 shows an example of a circuit configuration related to battery control in the vehicle drive system of the embodiment.

FIG. 8 shows an example of a circuit configuration related to battery control in the vehicle drive system of this embodiment. In the configuration of FIG. 8, Batt1, Batt2, Batt3, and Batt4 are each 48V batteries and respectively correspond to the batteries 18a, 18b, 18c, and 18d in the configuration of FIG. 2. The negative pole of the battery Batt1 and the positive pole of the battery Batt2 are connected, and their connection node is grounded (a neutral point). The battery Batt3 is connected in parallel with the battery Batt1, and the battery Batt4 is connected in parallel with the battery Batt2. The batteries Batt3 and Batt4 may be omitted.

A switch S1 is inserted between the positive pole of the battery Batt1 and the inverter 15a, and a switch S2 is inserted between the negative pole of the battery Batt2 and the inverter 15a. Also, it is made possible to supply 48V power and 12V power from the battery Batt1 to electric components inside the vehicle 1. A switch S3 is inserted between the positive pole of the battery Batt1 and a 48V power line. A switch S0 is inserted between the positive pole of one battery cell in the battery Batt1 and a 12V power line. The switches S0 to S3 are constituted by MOSFETs, for example. A DC/DC converter 41 converts 48V power supplied from the battery Batt1 to 12V power and outputs the converted power.

A balance circuit 30 (indicated as balance 0 in FIG. 8) is provided for the batteries Batt1 and Batt2. The balance circuit 30 has a function of balancing the charged amounts of the batteries Batt1 and Batt2 by performing charge/discharge control between the batteries Batt1 and Batt2. Also, cell balance circuits 31, 32, 33, and 34 (indicated as balances 1 to 4 in FIG. 8) are respectively provided for the batteries Batt1, Batt2, Batt3, and Batt4. The cell balance circuits 31 to 34 have a function of balancing the charged amounts of battery cells in the corresponding batteries.

A controller 42 performs on/off control of the switches S0 to S3 and control of the balance circuit 30 and the cell balance circuits 31 to 34. The controller 42 can be constituted by a microprocessor, a memory, an interface circuit, and programs for actuating these. The controller 42 may be configured integrally with the control unit 24 shown in FIG. 2 or separately from it.

Figure 9:
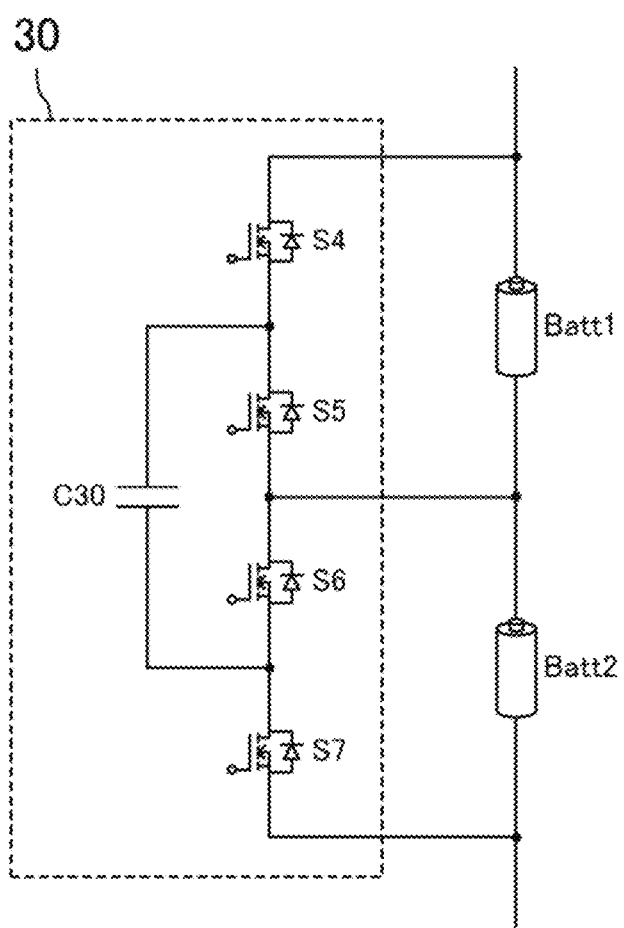
FIG. 9 shows a circuit configuration example of a balance circuit in FIG. 8.

FIG. 9 shows a circuit configuration example of the balance circuit 30. The balance circuit 30 of FIG. 9 includes switches S4 and S5 serially arranged between the positive and negative poles of the battery Batt1, switches S6 and S7 serially arranged between the positive and negative poles of the battery Batt2, and a capacitor C30 provided between the node of the switches S4 and S5 and the node of the switches S6 and S7. By controlling on/off of the switches S4 to S7, energy can be transferred from one of the batteries Batt1 and Batt2 to the other through the capacitor C30. The operation of the balance circuit 30 will be described later in detail.

Figure 10:
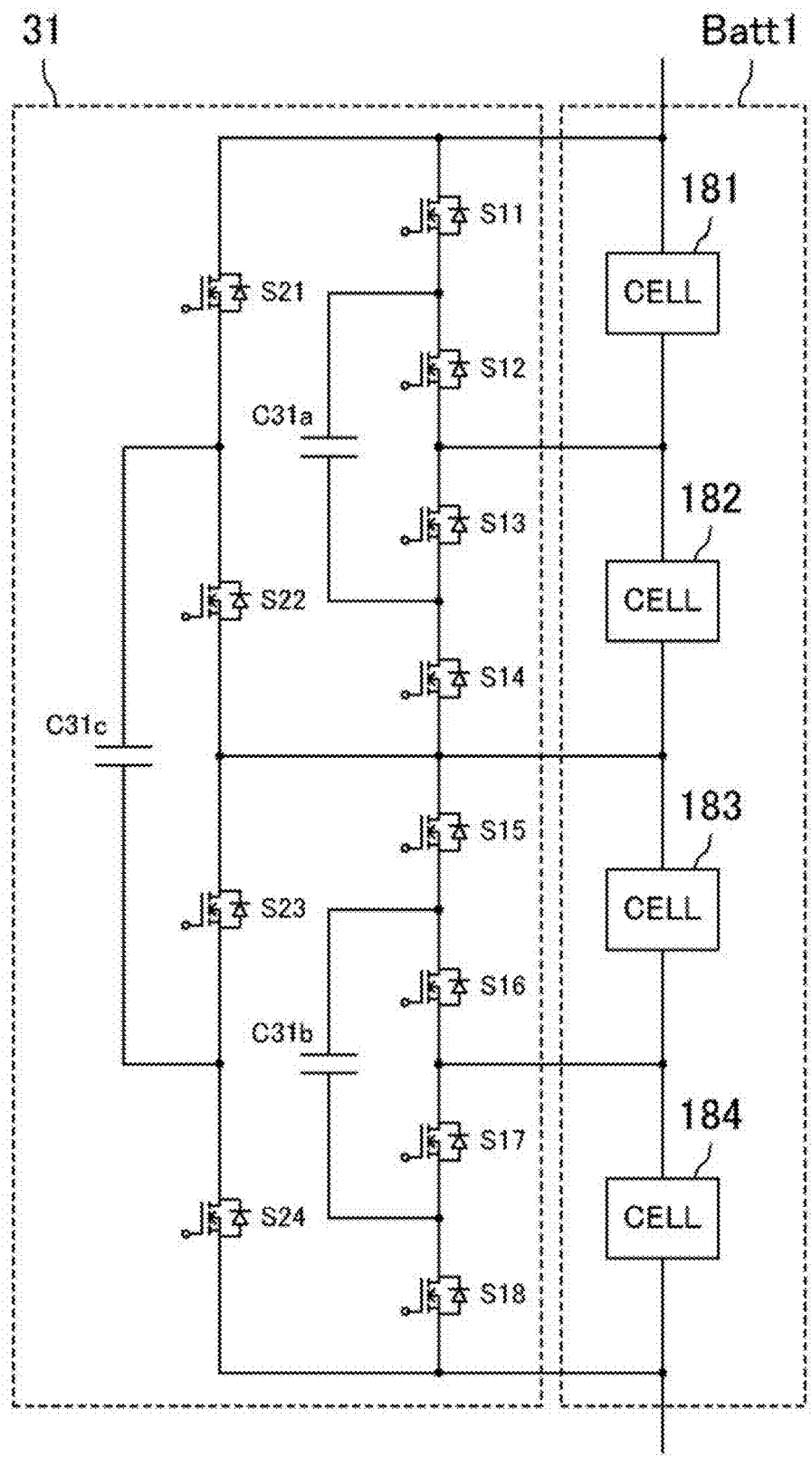
FIG. 10 shows a circuit configuration of a cell balance circuit in FIG. 8.

FIG. 10 shows a circuit configuration example of the cell balance circuit 31. Note that the cell balance circuits 32 to 34 may have a similar circuit configuration to that of FIG. 10. The battery Batt1 includes four serially-connected battery cells 181 to 184. The cell balance circuit 31 of FIG. 10 includes switches S11 to S14 and a capacitor C31a as a configuration for balancing the charged amounts of the battery cells 181 and 182. The cell balance circuit 31 also includes switches S15 to S18 and a capacitor C31b as a configuration for balancing the charged amounts of the battery cells 183 and 184. Further, the cell balance circuit 31 includes switches S21 to S24 and a capacitor C31c as a configuration for balancing the charged amount of the battery cells 181 and 182 and the charged amount of the battery cells 183 and 184. Note that detailed description on the operation of the cell balance circuit 31 is omitted here as it will be easily known by analogy from the operation of the balance circuit 30 that will be described hereinafter.

Figure 11:
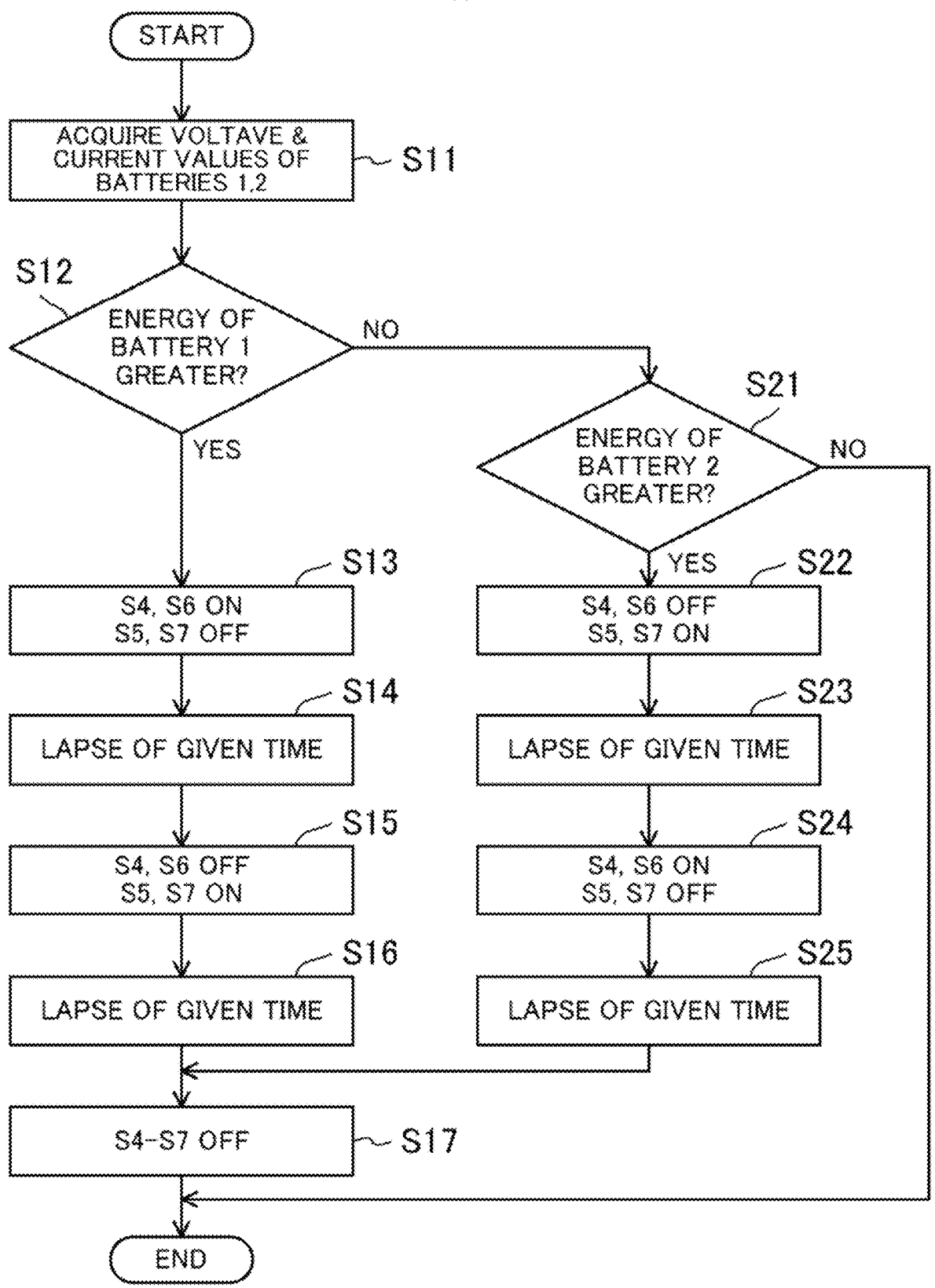
FIG. 11 is a flowchart showing the operation of the balance circuit.
Figure 12A:
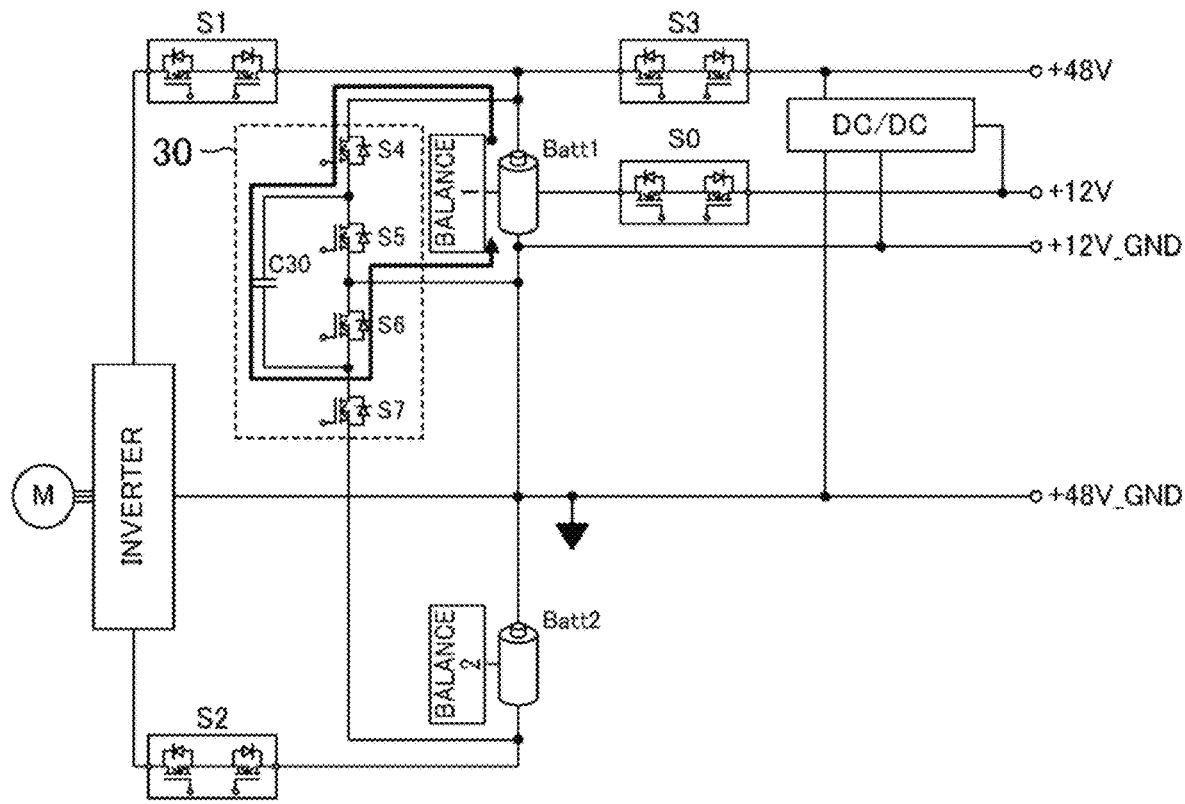
FIGS. 12A and 12B are views showing the operation of transferring energy from battery 1 to battery 2.
Figure 12B:
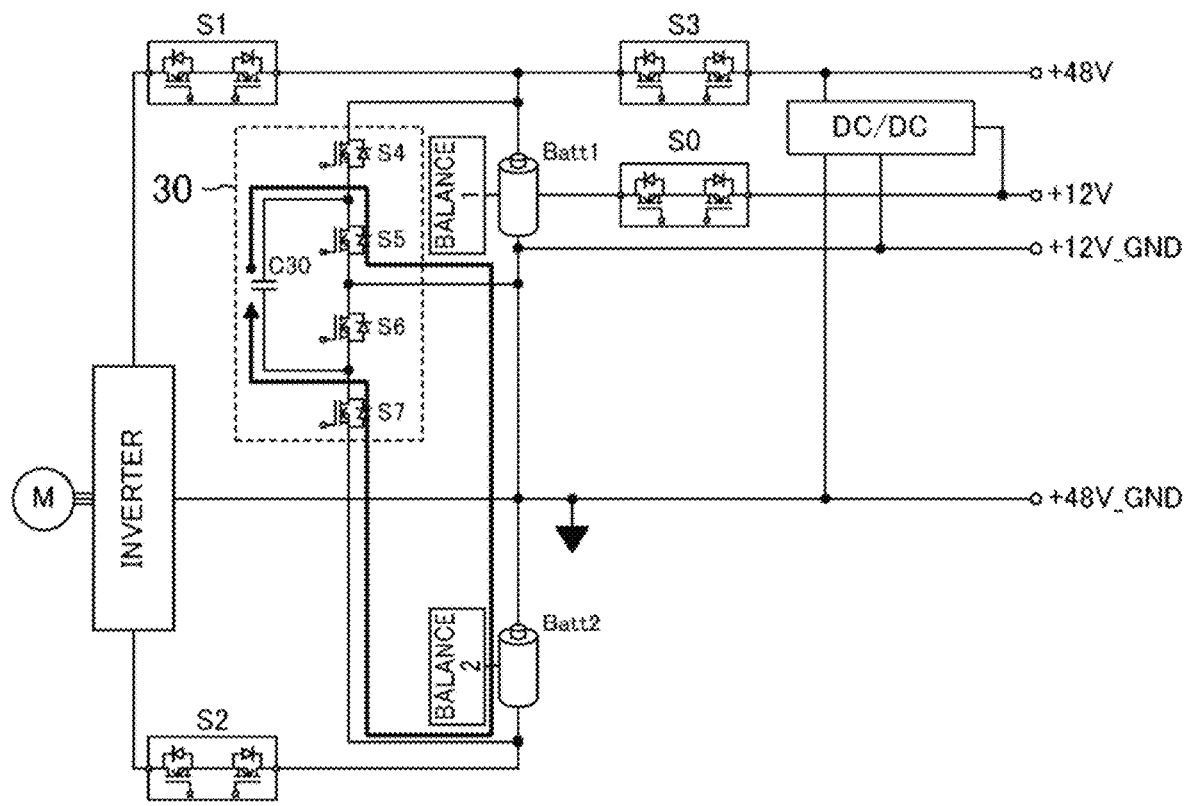
Figure 13A:
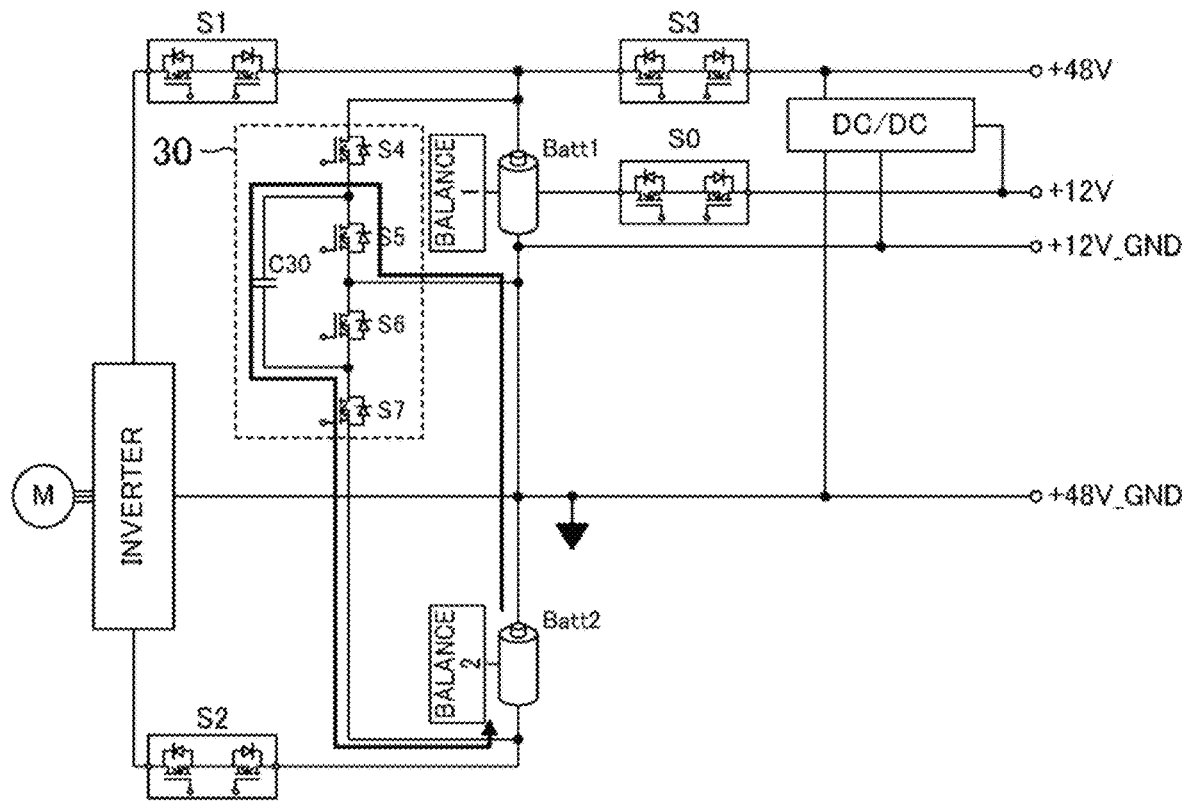
FIGS. 13A and 13B are views showing the operation of transferring energy from battery 2 to battery 1.
Figure 13B:
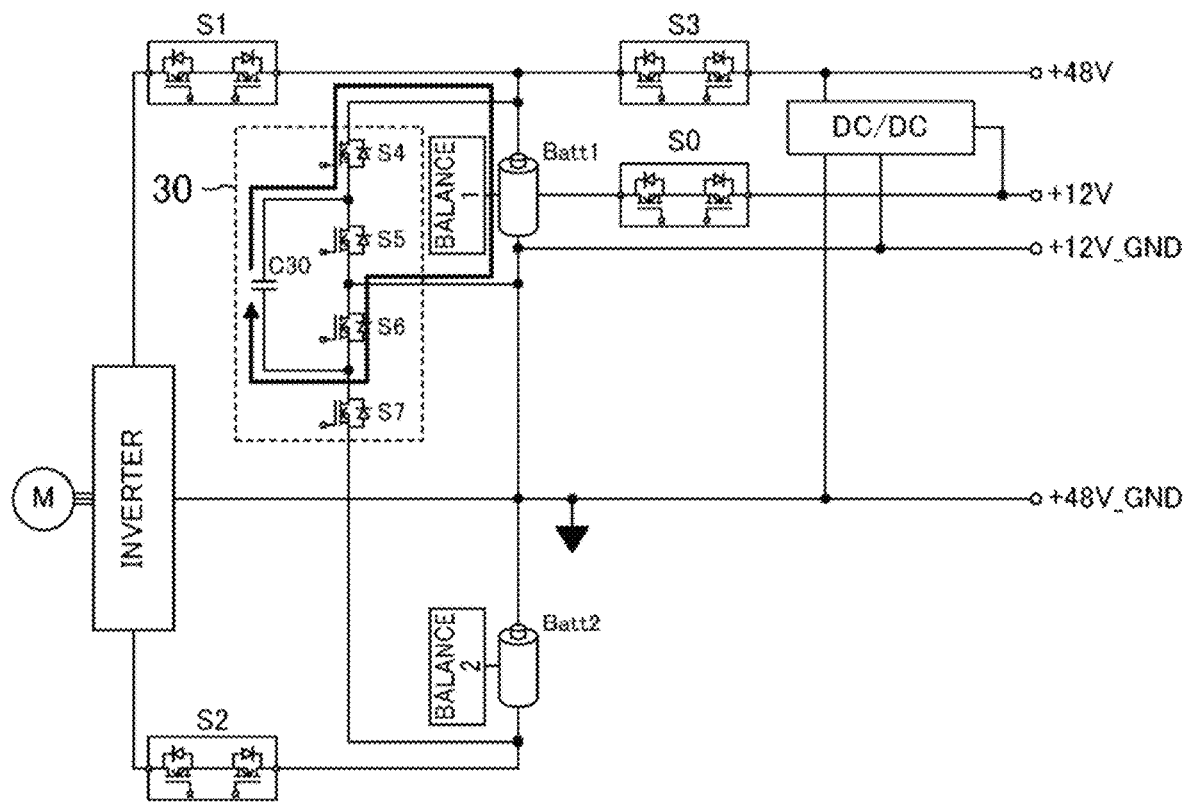

The operation of the balance circuit 30 is as follows. FIG. 11 is a flowchart showing the operation of the balance circuit 30. FIGS. 12A and 12B show the operation of transferring energy from the battery Batt1 to the battery Batt2, and FIGS. 13A and 13B show the operation of transferring energy from the battery Batt2 to the battery Batt1. Note that, in FIGS. 12A, 12B, 13A, and 13B, illustration of the batteries Batt3 and Batt4 and components related to these batteries is omitted for simplification of the drawings.

At the start of the operation of the balance circuit 30, the controller 42 acquires the voltage values and current values of the batteries Batt1 and Batt2 (step S11), and determines which of the batteries Batt1 and Batt2 has greater energy.

If the battery Batt1 has greater energy than the battery Batt2 (YES in step S12), the balance circuit 30 operates to transfer the energy of the battery Batt1 to the battery Batt2. That is, the controller 42 turns on the switches S4 and S6 and turns off the switches S5 and S7 in the balance circuit 30 (step S13). By this switching, as shown in FIG. 12A, the energy of the battery Batt1 starts to be transferred to the capacitor C30. After the lapse of a given time (step S14), the controller 42 turns off the switches S4 and S6 and turns on the switches S5 and S7 in the balance circuit 30 (step S15). By this switching, as shown in FIG. 12B, the energy stored in the capacitor C30 starts to be transferred to the battery Batt2. After the lapse of a given time (step S16), the controller 42 turns off the switches S4 to S7 (step S17). By this operation of the balance circuit 30, part of the energy of the battery Batt1 can be transferred to the battery Batt2.

Contrarily, if the battery Batt2 has greater energy than the battery Batt1 (YES in step S21), the balance circuit 30 operates to transfer the energy of the battery Batt2 to the battery Batt1. That is, the controller 42 turns off the switches S4 and S6 and turns on the switches S5 and S7 in the balance circuit 30 (step S22). By this switching, as shown in FIG. 13A, the energy of the battery Batt2 starts to be transferred to the capacitor C30. After the lapse of a given time (step S23), the controller 42 turns on the switches S4 and S6 and turns off the switches S5 and S7 in the balance circuit 30 (step S24). By this switching, as shown in FIG. 13B, the energy stored in the capacitor C30 starts to be transferred to the battery Batt1. After the lapse of a given time (step S25), the controller 42 turns off the switches S4 to S7 (step S17). By this operation of the balance circuit 30, part of the energy of the battery Batt2 can be transferred to the battery Batt1.

It may be configured not to operate the balance circuit 30, causing no energy transfer between the batteries Batt1 and Batt2, if the difference in energy between the batteries Batt1 and Batt2, if any, is less than a given value. That is, the battery Batt1 may be determined to have greater energy than the battery batt2 if the energy of the battery Batt1 is greater than that of the battery Batt2 by a given value or larger. Also, the battery Batt2 may be determined to have greater energy than the battery Batt1 if the energy of the battery Batt2 is greater than that of the battery Batt1 by a given value or larger.

The given time during which energy from the battery Batt1 or Batt2 is stored in the capacitor C30 may be determined in advance based on the capacity of the capacitor C30 and the capacities of the batteries Batt1 and Batt2.

The balance circuit 30 can be operated in the motor cruise mode in which the vehicle 1 is cruising by the motor and also in the engine cruise mode.

In the configuration of the balance circuit 30 of FIG. 9, an inductor L may be provided on an electric route between the connection node of the batteries Batt1 and Batt2 and the connection node of the switches S5 and S6. With this, energy can be transferred to the capacitor C30 by use of LC resonance even when the voltage difference between the batteries Batt1 and Batt2 is small.

In the configuration of FIG. 8, the cell balance circuits 31 to 34 may be omitted. In the battery Batt1, however, since 12V power is output from one battery cell, the charged amounts may be unbalanced among the battery cells. It is therefore preferable to provide the cell balance circuit 31 for the battery Batt1.

<Configuration Example of Battery Cartridge>

As described above, the third and fourth batteries 18c and 18d are cartridges configured to be removably loaded into the battery part 18. A configuration example of a battery cartridge according to this embodiment will be described hereinafter.

Figure 14:
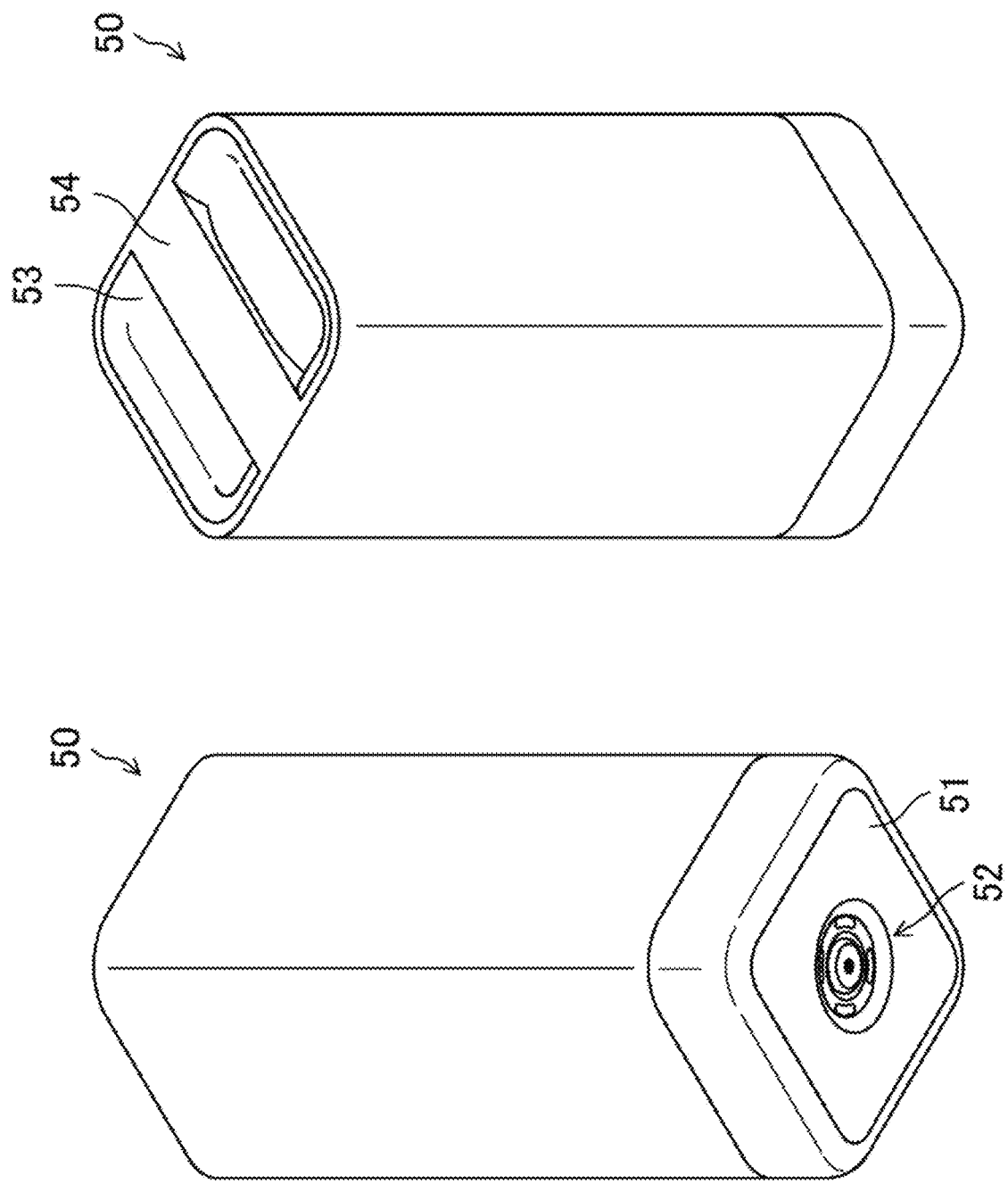
FIG. 14 shows an appearance example of a battery cartridge.
Figure 15:
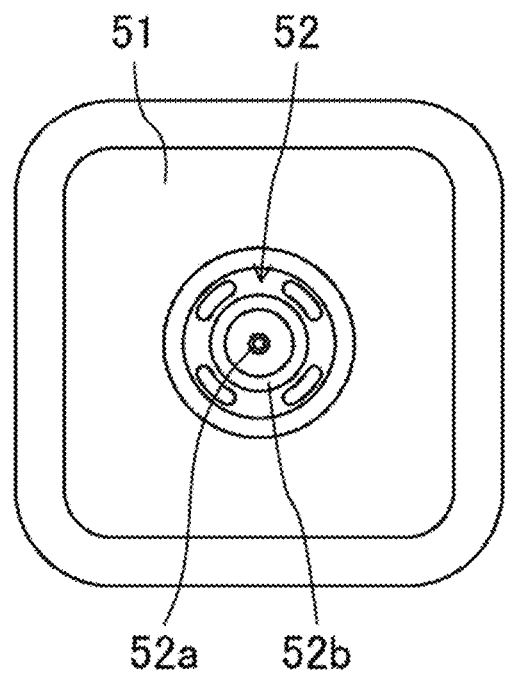
FIG. 15 shows a configuration example of an electric connecting part of the battery cartridge.

FIG. 14 shows an appearance example of a battery cartridge according to this embodiment, and FIG. 15 shows a configuration example of an electric connecting part of the battery cartridge. As shown in FIG. 14, the battery cartridge 50 has a roughly quadrangular prism shape, where the longitudinal edges of the side faces are rounded. As shown in FIG. 15, on one end face 51 of the battery cartridge 50, an electric connecting part 52 including a positive pole 52a and a negative pole 52b is formed. On the other end face 53, a handle 54 is formed. The battery cartridge 50 is slightly tapered from the end face 53 toward the end face 51.

Figure 16:
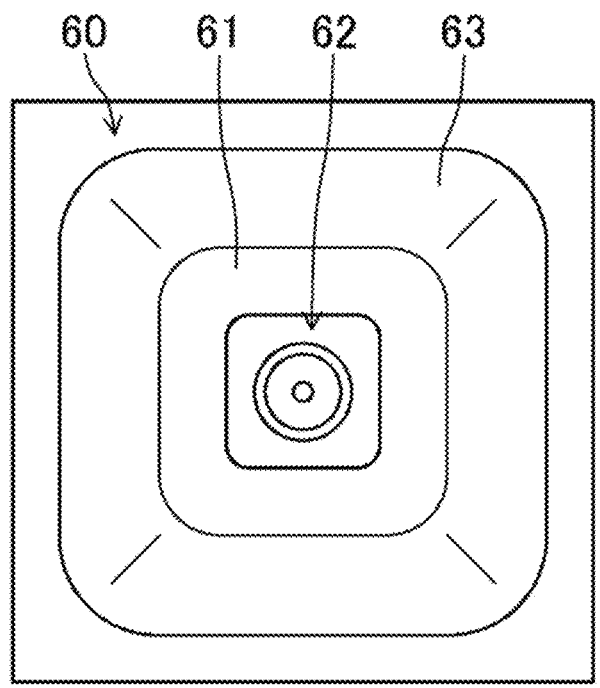
FIG. 16 shows a configuration example of a portion of a battery unit into which the battery cartridge is loaded.

FIG. 16 shows a configuration example of a portion of the battery unit 18 for loading of the battery cartridge 50. As shown in FIG. 16, the battery unit has a hole 60 into which the battery cartridge 50 is to be loaded. The hole 60 has a bottom 61 on which an electric connecting part 62 is formed. An elastic member 63 is provided on the side wall of the hole 60. When the battery cartridge 50 is loaded into the hole 60 with the end face 51 facing the bottom 61 of the hole 60, the electric connecting part 52 of the battery cartridge 50 is electrically connected with the electric connecting part 62 of the hole 60.

As described above, according to this embodiment, in the battery unit 18, since the connection node of the serially-connected batteries Batt1 and Batt2 is grounded, a positive voltage of the same value as the output voltage of the battery Batt1 and a negative voltage of which the absolute value is the same as the output voltage of the battery Batt2, with reference to the ground, are output from the battery unit 18. The operation of the inverter 15a is controlled so that the motor drive voltage output from the inverter 15a is higher than the output voltage of the battery Batt1 and also than the output voltage of the battery Batt2. By this control, it is possible to increase the output of the motor 16 while reducing the voltage of the output of the battery unit 18 thereby keeping the vehicle weight and cost from increasing.

Further, the battery unit 18 is configured so that the cartridge batteries 18c and 18d are removably loaded, and the loaded battery 18c is connected in parallel with the battery 18a and the loaded battery 18d is connected in parallel with the battery 18b. This makes it possible to use an auxiliary battery and also makes replacement of the auxiliary battery easy, whereby the problem of the cruising distance can be alleviated.

While the batteries 18a and 18b are fixed in the battery unit 18 in this embodiment, at least one of the batteries 18a and 18b may be a battery cartridge. For example, the configuration example of the battery cartridge and the battery unit shown in FIGS. 14 to 16 may be applied to at least one of the batteries 18a and 18b. This makes it easy to replace at least one of the batteries 18a and 18b, whereby the problem of the cruising distance can be alleviated.

In this embodiment, the vehicle 1 is a one-row seat vehicle, and the battery unit 18 is placed behind the seat 3 and in front of the fuel tank 30. It is preferable to place the battery unit 18 at a position like this, i.e., behind a rearmost seat and in front of the fuel tank. At such a position, a worker can easily access the battery unit, and thus battery replacement becomes further easy. Also, luggage space can be secured. The placement position of the battery unit is not limited to this indicated in this embodiment, but may be under the floor, for example. Otherwise, the battery unit may be divided and placed at a plurality of positions. For example, a portion of the battery unit that houses a battery cartridge may be placed at a position behind a rear seat easily accessible to a worker, and a portion thereof where a battery is fixed may be placed under the floor.

In this embodiment, the balance circuit 30 that balances the charged amounts of the batteries Batt1 and Batt2 by performing charge/discharge control between the batteries Batt1 and Batt2 is provided. However, even in the case of not providing the balance circuit 30, the configuration may be made to use a battery cartridge in the battery unit 18 as in this embodiment.

While the inverter 15a is a 3-level inverter in this embodiment, the present disclosure is not limited to this. For example, the inverter 15a may be a multi-level inverter such as a 4-level inverter and a 5-level inverter. Otherwise, the inverter 15a may be an inverter that is not a multi-level inverter but of which the operation is controlled so that the motor drive voltage output therefrom is higher than the output voltage of the battery Batt1 and also than the output voltage of the battery Batt2.

Also, while the battery unit 18 includes the batteries 18a and 18b fixed in the vehicle 1 and the removable cartridge batteries 18c and 18d in this embodiment, the number of batteries and the forms thereof are not limited to these. For example, the battery unit may include two batteries fixed in the vehicle and no cartridge batteries.

The voltage of each battery, the number of battery cells constituting the battery, and the voltage of each battery cell are not limited to those described in this embodiment. It is however preferable that the output voltage of each battery is less than 60V, for example, from the standpoint of the objective of the present disclosure of reducing the output voltage of the battery unit to keep the vehicle weight and cost from increasing.

While description has been made assuming that the vehicle drive system of this embodiment is a hybrid drive system, the present disclosure may also be applied to a motor drive system.

It is to be understood that the above-described embodiment is a mere illustration and the scope of the present disclosure should not be construed restrictively. It is also to be understood that the scope of the present disclosure is defined by the appended claims, and that all changes and modifications belonging to the equivalent scope of the claims will fall within the scope of the present disclosure.

What is claimed is:

1. A vehicle drive system, comprising:
a motor that generates driving force for drive wheels;
an inverter electrically connected to the motor;
a battery unit that supplies electric power to the inverter; and
a control unit that controls operation of the inverter, wherein
the battery unit is configured to house a first and second batteries, and configured so that, when the first and second batteries are housed, the first and second batteries are serially connected, and a negative pole of the first battery and a positive pole of the second battery that are mutually connected are grounded,
the control unit controls the operation of the inverter so that a voltage output from the inverter to the motor is higher than an output voltage of the first battery and also than an output voltage of the second battery,
at least one of the first and second batteries is a battery cartridge configured to be removably loaded into the battery unit, and,
the battery cartridge has a roughly quadrangular prism shape, with a first electric connecting part including a positive pole and a negative pole formed on one of end faces of the battery cartridge and a handle formed on the other end face.

2. The vehicle drive system of claim 1, wherein
the battery unit has a hole for loading the battery cartridge, and
the hole has a second electric connecting part on its bottom and is configured so that, when the battery cartridge is loaded into the hole with the one end face of the battery cartridge facing the bottom of the hole, the first electric connecting part is electrically connected with the second electric connecting part.

3. The vehicle drive system of claim 1, wherein
the battery unit is placed behind a rearmost seat and in front of a fuel tank in the vehicle.

4. The vehicle drive system of claim 1, further comprising:
a balance circuit that balances charged amounts of the first and second batteries by performing charge/discharge control between the first and second batteries.

5. The vehicle drive system of claim 1, wherein
the inverter is a multi-level inverter.

6. The vehicle drive system of claim 1, further comprising:
an engine that drives rear wheels; and
a force transmission mechanism that transmits driving force to the rear wheels,
wherein
the motor includes a main drive motor that drives the rear wheels and a sub-drive motor that drives front wheels,
the inverter includes a first inverter electrically connected to the main drive motor and a second inverter electrically connected to the sub-drive motor,
the batteries supply electric power to the first and second inverters, and
the control unit controls the engine and the first and second inverters.

7. The vehicle drive system of claim 6, wherein
the main drive motor is placed to be adjacent to the engine on the rear side of the engine.

8. The vehicle drive system of claim 6, wherein
a switch for selecting an engine cruise mode or a motor cruise mode is provided in the vehicle, and
the control unit controls so that
in the motor cruise mode, while electric power from the battery unit is supplied to the first inverter to drive the main drive motor, no fuel is supplied to the engine, and
in the engine cruise mode, while fuel is supplied to the engine, control of the first inverter is stopped to stop driving by the main drive motor.

9. A vehicle drive system, comprising:
a motor that generates driving force for drive wheels;
an inverter electrically connected to the motor;
a battery unit that supplies electric power to the inverter; and
a control unit that controls operation of the inverter, wherein
the battery unit has serially-connected first and second batteries, and a negative pole of the first battery and a positive pole of the second battery that are mutually connected are grounded,
the control unit controls the operation of the inverter so that a voltage output from the inverter to the motor is higher than an output voltage of the first battery and also than an output voltage of the second battery,
the battery unit is configured so that third and fourth batteries each in a form of a cartridge are removably loaded, and the loaded third battery is connected in parallel with the first battery and the loaded fourth battery is connected in parallel with the second battery, and
the third and fourth batteries each have a roughly quadrangular prism shape, with a first electric connecting part including a positive pole and a negative pole formed on one of end faces of the battery and a handle formed on the other end face.

10. The vehicle drive system of claim 9, wherein
the battery unit has a hole for loading each of the third and fourth batteries, and
the hole has a second electric connecting part on its bottom and is configured so that, when the third or fourth battery is loaded into the hole with the one end face of the battery facing the bottom of the hole, the first electric connecting part is electrically connected with the second electric connecting part.

11. A vehicle drive system, comprising:
a motor that generates driving force for drive wheels;
an inverter electrically connected to the motor;
a battery unit that supplies electric power to the inverter; and
a control unit that controls operation of the inverter,
wherein
the battery unit is configured to house a first and second batteries, and configured so that, when the first and second batteries are housed, the first and second batteries are serially connected, and a negative pole of the first battery and a positive pole of the second battery that are mutually connected are grounded,
the control unit controls the operation of the inverter so that a voltage output from the inverter to the motor is higher than an output voltage of the first battery and also than an output voltage of the second battery,
at least one of the first and second batteries is a battery cartridge configured to be removably loaded into the battery unit, and,
the battery unit is placed behind a rearmost seat and in front of a fuel tank in the vehicle.

12. A vehicle drive system, comprising:
a motor that generates driving force for drive wheels;
an inverter electrically connected to the motor;
a battery unit that supplies electric power to the inverter; and
a control unit that controls operation of the inverter,
wherein
the battery unit is configured to house a first and second batteries, and configured so that, when the first and second batteries are housed, the first and second batteries are serially connected, and a negative pole of the first battery and a positive pole of the second battery that are mutually connected are grounded,
the control unit controls the operation of the inverter so that a voltage output from the inverter to the motor is higher than an output voltage of the first battery and also than an output voltage of the second battery,
at least one of the first and second batteries is a battery cartridge configured to be removably loaded into the battery unit, and,
the vehicle drive system further comprises:
an engine that drives rear wheels; and
a force transmission mechanism that transmits driving force to the rear wheels,
wherein
the motor includes a main drive motor that drives the rear wheels and a sub-drive motor that drives front wheels,
the inverter includes a first inverter electrically connected to the main drive motor and a second inverter electrically connected to the sub-drive motor,
the batteries supply electric power to the first and second inverters, and
the control unit controls the engine and the first and second inverters.

13. The vehicle drive system of claim 12, wherein
the engine is a rotary engine and placed in a front part of the vehicle.

14. The vehicle drive system of claim 12, wherein
the main drive motor is placed to be adjacent to the engine on the rear side of the engine.

15. The vehicle drive system of claim 12, wherein
the sub-drive motor is an in-wheel motor housed in each of the front wheels.

16. The vehicle drive system of claim 12, wherein
a switch for selecting an engine cruise mode or a motor cruise mode is provided in the vehicle, and
the control unit controls so that
in the motor cruise mode, while electric power from the battery unit is supplied to the first inverter to drive the main drive motor, no fuel is supplied to the engine, and
in the engine cruise mode, while fuel is supplied to the engine, control of the first inverter is stopped to stop driving by the main drive motor.

* * * * *